United States Patent
Okada et al.

(10) Patent No.: US 7,165,183 B2
(45) Date of Patent: Jan. 16, 2007

(54) TEMPERATURE CONTROLLED SEMICONDUCTOR CIRCUIT

(75) Inventors: Atsuhiko Okada, Tokyo (JP); Hideaki Wada, Tokyo (JP); Mitsuaki Watanabe, Tokyo (JP); Hajime Iwai, Tokyo (JP); Hirosuke Tabata, Tokyo (JP); Shingo Kazuma, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 346 days.

(21) Appl. No.: 10/284,132

(22) Filed: Oct. 31, 2002

(65) Prior Publication Data
US 2003/0226084 A1   Dec. 4, 2003

(30) Foreign Application Priority Data
May 28, 2002   (JP)   .............................. 2002-154534

(51) Int. Cl.
*G06F 1/10*   (2006.01)
(52) U.S. Cl. ...................... 713/322; 702/132; 713/320; 710/250; 700/295
(58) Field of Classification Search ................ 713/300, 713/310, 320, 322, 323, 324, 330, 340, 375, 713/400, 401, 500, 600
See application file for complete search history.

(56) References Cited

U.S. PATENT DOCUMENTS

| | | | | |
|---|---|---|---|---|
| 5,483,656 A | * | 1/1996 | Oprescu et al. | ............. 713/320 |
| 5,713,030 A | * | 1/1998 | Evoy | ........................... 713/322 |
| 5,736,995 A | * | 4/1998 | Bohorquez et al. | ........... 347/14 |
| 6,047,248 A | * | 4/2000 | Georgiou et al. | ........... 702/132 |
| 6,167,330 A | * | 12/2000 | Linderman | ................... 700/295 |
| 6,487,668 B1 | * | 11/2002 | Thomas et al. | ............. 713/322 |
| 6,718,474 B1 | * | 4/2004 | Somers et al. | ............. 713/322 |
| 2002/0116563 A1 | * | 8/2002 | Lever | .......................... 710/260 |
| 2002/0118045 A1 | * | 8/2002 | Horlander | ....................... 327/3 |
| 2003/0215002 A1 | * | 11/2003 | Gorday et al. | .............. 375/147 |
| 2004/0182563 A1 | * | 9/2004 | Jeong | ......................... 165/206 |

FOREIGN PATENT DOCUMENTS

| | | |
|---|---|---|
| JP | 09-237132 | 9/1997 |
| JP | 10-124168 | 5/1998 |
| JP | 2000-222061 | 8/2000 |

\* cited by examiner

*Primary Examiner*—James K. Trujillo
*Assistant Examiner*—Fahmida Rahman
(74) *Attorney, Agent, or Firm*—Rabin & Berdo, P.C.

(57) ABSTRACT

An interrupt signal EMG is put out to a microprocessor 10 when a thermal monitor 40 detects that a package temperature exceeds a reference. The microprocessor then increases a frequency division value N stored in a frequency division value register 31 of a clock mechanism 30. An inputted clock signal MCK is divided by N to generate a system clock signal SCK. Therefore, the frequency of system clock signal SCK decreases when N increases. Consequently, electricity consumption of each function module 20i decreases and the package temperature is reduced.

5 Claims, 12 Drawing Sheets

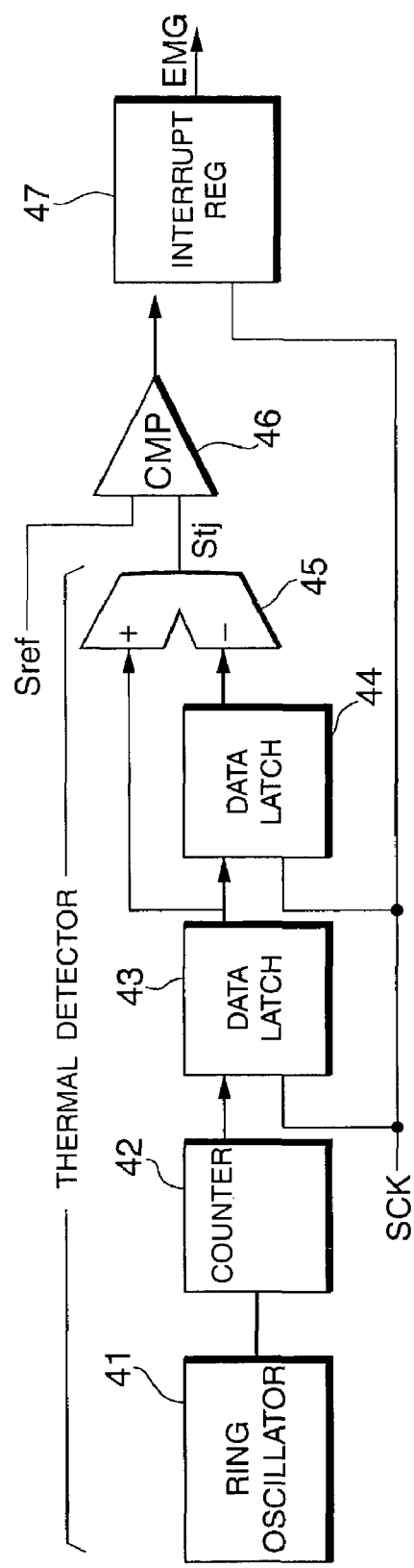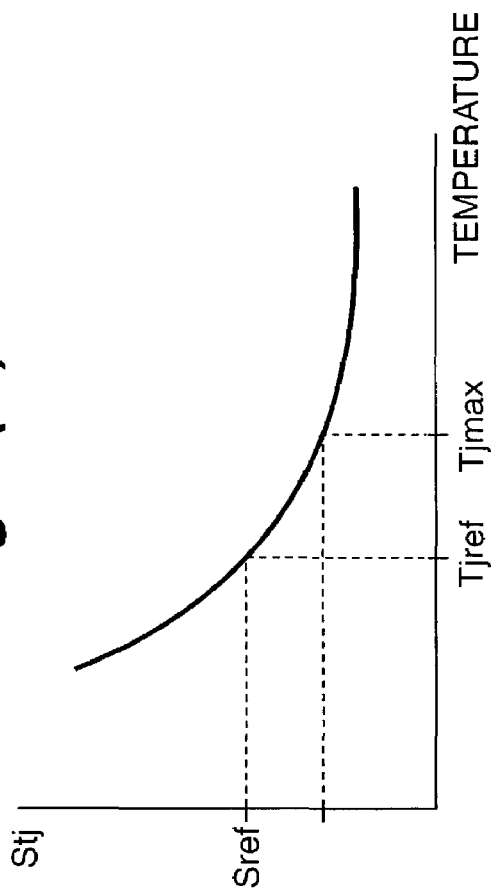

| PRIORITY | FUNCTION MODULE | OPERATION STATE |
|---|---|---|
| 1 | FUNCTION MODULE 2 | ON |
| 2 | FUNCTION MODULE N | OFF |
| N-2 | FUNCTION MODULE j | ON |
| N-1 | FUNCTION MODULE m | OFF |
| N | FUNCTION MODULE i | ON |

PRIORITY TABLE

WAVE FIGURE OPERATION

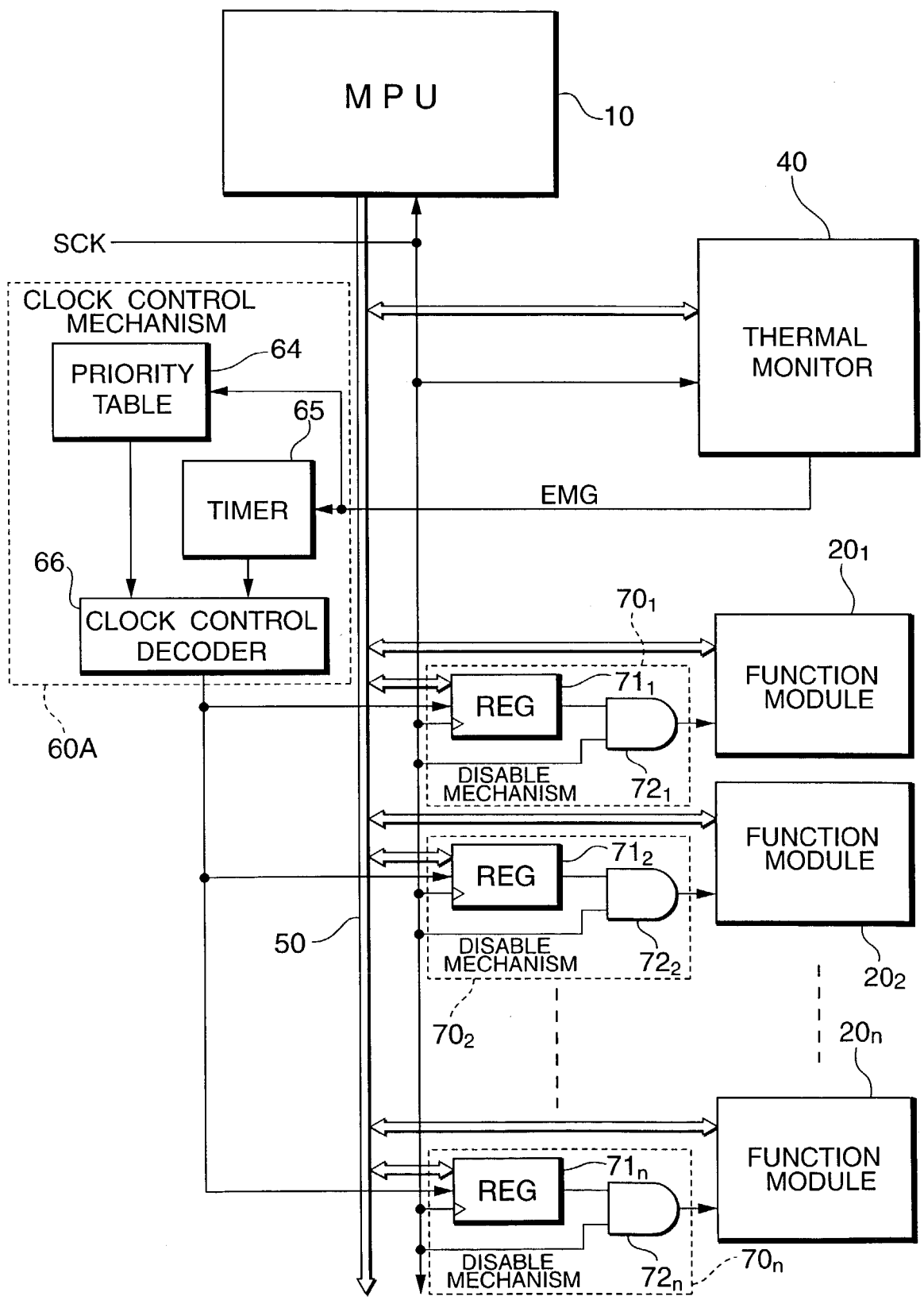

TEMPERATURE CONTROLLED SEMICONDUCTOR CIRCUIT

BACKGROUND OF THE INVENTION

1. Field of the Invention

The present invention relates to a semiconductor integrated circuit which performs various kinds of operation processes, and particularly to what controls electricity consumption in it.

2. Description of Related Art

In the field of semiconductor integrated circuits, the operational speed of processors is becoming higher. Accordingly the frequency of a system clock signal is becoming higher and electricity consumption in the circuit is becoming larger. But, this high speed operation is not always needed in actual application processes. So, the system clock signal frequency is controlled.

A conventional semiconductor integrated circuit with this kind of control will be described according to FIG. 2.

The circuit in FIG. 2 comprises a microprocessor (MPU) 1, plural function modules 2i(i=1,2, . . . ,n), and a clock gear mechanism 3. The microprocessor is what controls the system overall, and each function module 2i performs a process such as communication control or graphic compression etc. The clock gear mechanism 3 is what divides the frequency of an inputted clock signal MCK according to the control by microprocessor 1.

The microprocessor 1, function modules 2i, and clock gear mechanism 3 are connected with a system bus 4. On the other hand, a system clock signal SCK generated by clock gear mec. 3 is provided to microprocessor 1 via clock signal line 5. Moreover, each function module 2i is provided with the system clock signal SCK via a disable mechanism 6i which comprises a register (REG) and an AND gate respectively.

The electric power Pw consumed in a semiconductor integrated circuit is represented in general by next formula.

$$Pw = \Sigma \alpha i \cdot \beta i \cdot f$$

In this, $\alpha i$ represents current consumed when it flows through elements in function module 2i, $\beta i$ represents toggling rate of elements in function module 2i per unit time, and f represents operating frequency.

Moreover, the maximum consumed power Pwmax needs to be designed according to next formula where Rj is thermal resistance of the package and Tjmax is junction limit temperature of transistor.

$$Pwmax \leq Tjmax/Rj$$

Therefore, in the state of operating all the function module 2i in FIG. 2, for the total power consumed not to exceed Pwmax, the frequency division value is set, so as to limit the frequency f of system clock signal SCK. In this limiting of frequency f, the toggling rate is assumed as "1".

Moreover, when all modules 2i do not need simultaneous operation, the individual operation of each function module 2i is controlled by each disable mec.6j. And, system clock signal SCK is stopped providing for unnecessary function modules. Thus, electricity consumption is restrained instead frequency of system clock signal SCK is increased. That is, according to next formula, different operating frequency fi is provided to each function module 2i $$Pw = \Sigma \alpha i \cdot \beta i \cdot fi$$

However, the conventional semiconductor circuit had next subject.

The maximum operating frequency fmax is set by microprocessor 1 according to the formula mentioned above, as toggling rate $\beta i$ is let be "1". But, a certain period of time is needed for $\beta i$ to become "1". When the value of $\beta i$ comes near to "1", almost all the elements repeat charging and discharging. To be such an operating state, a certain period of time is needed. Therefore, for this certain period of time, temp.Tj of transistor does not become Tj>Tjmax even if clock frequency is let be beyond fmax. Consequently, within this certain period of time, process ability can be temporarily raised up by setting clock frequency beyond maximum operating frequency temporarily. In spite of this, the circuit in FIG. 2 could never do this. For it could not exactly watch the actual temp.Tj.

Moreover, even if operation of function module 2i is restrained by the operating system of microprocessor 1, the user application program does not always accord with this restraint. Therefore, there is a possibility of operating too many function modules. And, it is threatened that the circuit may go in malfunction owing to overheat.

SUMMARY OF THE INVENTION

Therefore, the present invention aimed at providing a semiconductor integrated circuit which can be controlled operating at the most adequate speed not causing overheat and making use of available process ability near the operation starting time.

As 1st invention, provided is a semiconductor integrated circuit comprising plural function modules performing different processes respectively, a thermal detecting means to detect the temperature of prescribed region of substrate (hereinafter described as substrate temp.) to compare it with reference value and put out detecting signal as a result, a clock providing means to provide each function module with the inputted clock signal divided in a frequency division value set in a frequency division register, and a microprocessor processing control all over the system including the plural function modules as well as processing control the frequency division value to set according to the detecting signal of the thermal detecting means.

As 2nd invention, provided is what comprising a microprocessor made up for processing control to increase frequency division value when it is indicated by the detecting signal that the substrate temp. exceeded the reference temp.

According to 1st and 2nd inventions, as made up configuration mentioned above, next operation is performed.

The substrate temp. is compared with the reference temp. by thermal detecting means. And, a detecting signal is put out as a result of comparing. The frequency division value of frequency division register in clock providing means is controlled by microprocessor according to the detecting signal. In the clock providing means, the inputted clock signal is divided in the frequency division controlled, so as to provide each function module with it. For example, the frequency division value is increased when substrate temp. exceeded reference temp. And, the frequency of clock signal provided to function module decreases.

Thus, adequate frequency of clock signal is set by 1st invention. And, overheat is prevented by 2nd invention because clock signal frequency only decreases but does not increase.

As 3rd invention, provided is a semiconductor integrated circuit comprising plural function modules performing different processes respectively, a thermal detecting means to put out an interrupt signal when substrate temp. exceeded reference temp., a clock providing means to provide each function module with the inputted clock signal divided in a frequency division value set in a frequency division register, when the interrupt signal is not given, on the other hand, divided in an emergency frequency division value set in an emergency frequency division value register, and a microprocessor processing control all over the system including the plural function modules as well as processing control the frequency division value to set according to the detecting signal of the thermal detecting means.

According to 3rd invention, next operation is performed.

The interrupt signal is not put out when substrate temp. stays below reference temp, the inputted clock signal is divided in the value set in the frequency division register in the clock providing means, so as to provide each function module with it. When substrate temp. goes up beyond reference temp. the interrupt signal is put out. In the clock providing means, the inputted clock signal is divided in the emergency value set in the emergency frequency division value register. And, it is provided to each function module. Thus, the frequency of clock signal provided to each function module decreases. And, heat generation decreases. So, increase of substrate temp. is restrained.

As 4th invention, provided is a semiconductor integrated circuit comprising plural function modules performing different processes respectively, a thermal detecting means to put out an interrupt signal when substrate temp. exceeded reference temp., an operation controlling means to provide each module with operation controlling signal at regular interval according to a table which is compiled from the registration of operation stop order of the function module when the interrupt signal is given, and a clock controlling means to control output of clock signal to corresponding function module according to the operation controlling signal.

According to 4th invention, next operation is performed.

When substrate temp. exceeded ref.temp., an interrupt signal is put out from the thermal detecting means. And, an operation controlling signal is put out from the operation controlling means for a function module according to the table. Thus, controlled is an output of clock signal for each function module from the clock controlling means. When the interrupt signal continued to be put out, the operation controlling signal is alternated at regular interval according to the table. The operation of each function module is stopped one after another.

As 5th invention, provided is a semiconductor integrated circtuit comprising plural function modules performing different processes respectively, a thermal detecting means to put out an operation controlling signal for stopping function modules in order at the first interval according to a table which is compiled from the priority of function module operation when the interrupt signal is given and put out another operation controlling signal for starting function modules in order at the second interval according to the table, and a clock controlling means to control output of clock signal for corresponding function module according to the operation control signal.

As 6th invention, the table of operation controlling means in 4th or 5th invention is compiled from registration of operation stopping order according to process contents of function module.

As 7th invention, the table of operation controlling means in 4th or 5th invention is compiled from registration of operation stopping order according to electricity consumption.

According to 5th to 7th invention, next operation is performed.

When substrate temp. exceeded reference temp, an interrupt signal is put out from thermal detecting means. And an operation controlling signal is put out for each function module from operation controlling means according to the priority set in a table. Thus, the output of clock signal for each function module from the clock controlling means is controlled. When the interrupt signal continues to be given, function modules are stopped in order according to the table at the first interval. On the other hand, when the interrupt signal is not given, function modules stopping is started at the second interval.

As 8th invention, provided is a semiconductor integrated circuit comprising plural function modules performing different processes respectively, a thermal detecting means to detect substrate temp. and compare it with reference temp. to put out detecting signal as a result of comparing, and a clock providing means to provide each function module with inputted clock signal divided in frequency division value controlled.

As 9th invention, the clock providing means in 8th invention is made up for controlling to count up frequency division value at regular interval when it is indicated by detecting signal that substrate temp. exceeded reference temp.

As 10th invention, the thermal detecting means in 8th invention is made up for putting out the first detecting signal when substrate temp. is higher than the first reference temp, and putting out the second detecting signal when substrate temp, is lower than the second reference temp.

Moreover, the clock providing means is made up for counting up frequency division value at regular interval when the first detecting signal is given and counting down frequency division value at regular interval when the second signal is given.

According to 8th to 10th invention, next operation is performed.

The substrate temp. is detected by thermal detecting means, put out is a detecting signal as a result of comparing it with reference temp. In clock providing means, frequency division value is controlled according to the detecting signal. And, the inputted clock signal is divided in the frequency division value controlled, so as to provide each module with it.

As 11th invention, provided is a semiconductor integrated circuit comprising plural function modules performing different processes respectively, a thermal detecting means to detect substrate temp. and compare it with reference temp. to put out detecting signal as a result of comparing, a clock generating means to generate a clock signal to provide function module with inputted clock signal divided in frequency division value which is increased or decreased according to the detecting signal, an operation controlling means to put out operation controlling signal for function module by the detecting signal according to the table which is compiled from priority of function module, and a clock controlling means to control output of the clock signal for function module according to the operation controlling signal.

According to 11th invention, next operation is performed.

The substrate temp. is detected by thermal detecting means, and a detecting signal is put out as a result of comparing it with reference temp. In clock generating means, frequency division value is increased or decreased according to detecting signal. And, the inputted clock signal is divided in the frequency division value to generate clock signal which is provided to each function module. On the other hand, in operation processing means, an operation controlling signal for each function module is put out according to the table which is set priority of function module. In clock controlling means, output of clock signal for each function module is controlled according to operation controlling signal.

As 12th invention, the prescribed region where substrate temp. is detected in 1st to 11th invention is selected a specific function module among plural function module or microprocessor

BRIEF DESCRIPTION OF THE DRAWINGS

FIG. 3 shows configuration and operation of thermal monitor 40 in FIG. 1.

FIG. 8 is a block diagram showing the circuit of Embodiment 4.

DESCRIPTION OF THE PREFERRED EMBODIMENTS

Figure 1:
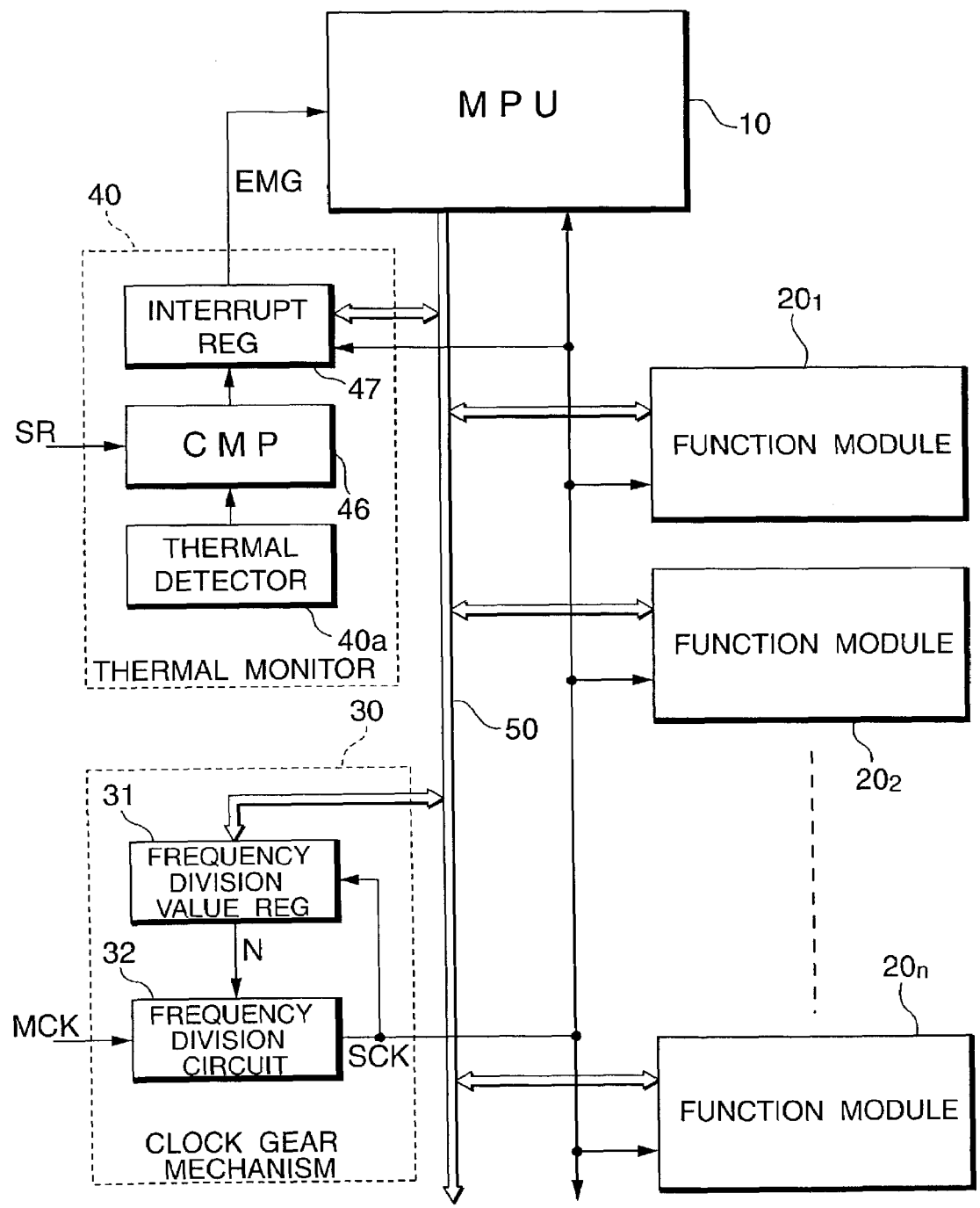
FIG. 1 is a block diagram showing the semiconductor integrated circuit of Embodiment 1 of present invention.
Figure 2:
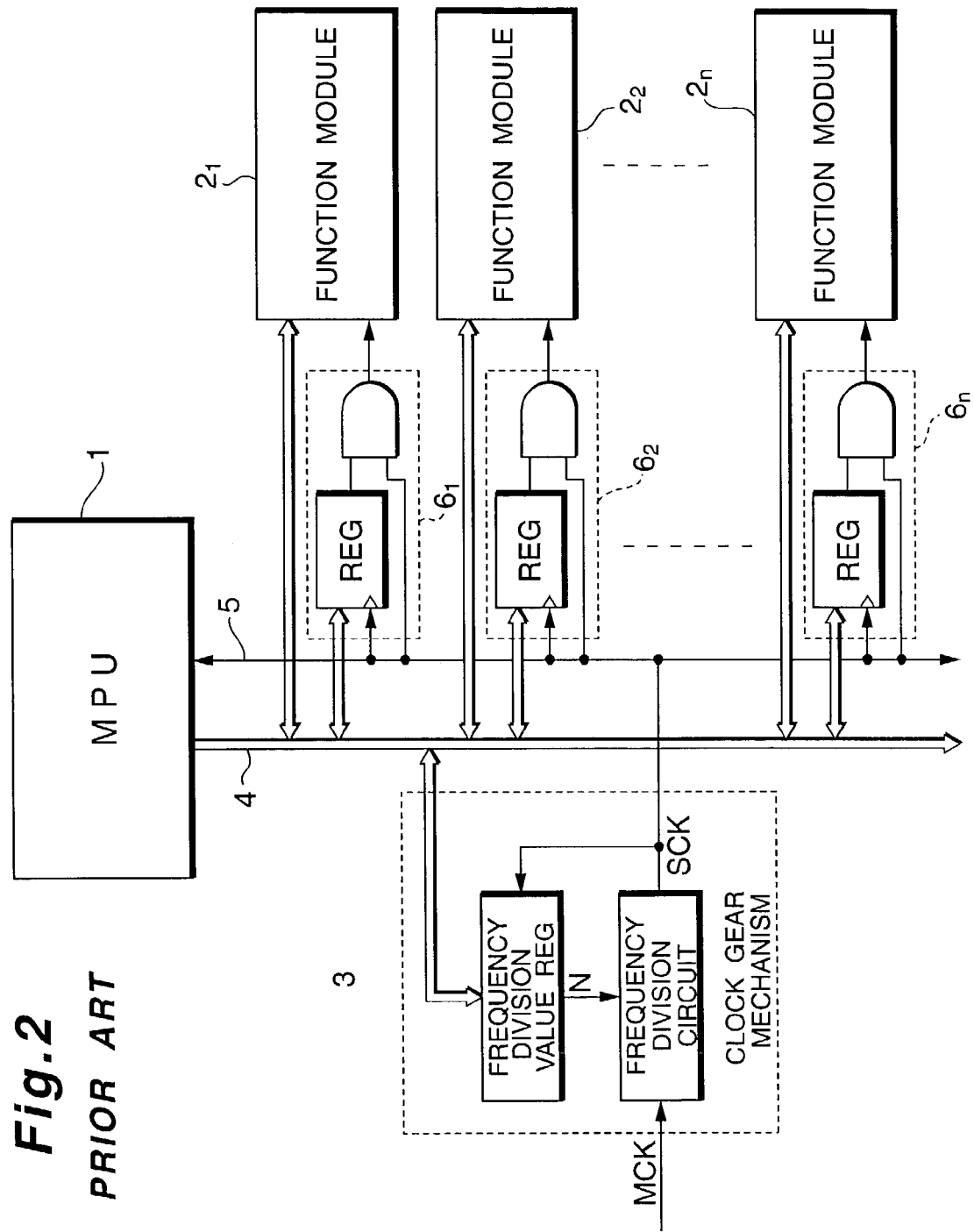
FIG. 2 is a block diagram showing the similar circuit of prior art.

The embodiments preferred by the inventor of the present invention will be now described with reference to the accompanying drawings hereinafter.

<Embodiment 1>

The first embodiment of present invention will be described referring to the semiconductor integrated circuit shown in FIG. 1.

This semiconductor integrated circuit comprises a microprocessor 10, single or plural function modules 20i (i=1, 2, . . . ,n), a clock providing means (for example, a clock gear mechanism) 30, and a thermal detecting means (for example, a thermal monitor) 40. The microprocessor 10 processes control of all over the system including the plural function modules 20i. Moreover, each function module 20i performs respectively individual processes of communication control of LAN etc. or graphical data compression encoding by MPEF standard etc.

The clock gear mechanism 30 divides an inputted clock signal MCK so as to generate a system clock signal SCK. It comprises a frequency dividing value register 31 which memorizes a frequency dividing value given by the microprocessor 10, and a frequency division circuit 32 which divides the inputted clock signal MCK into 1/N according to the frequency dividing value N memorized in the frequency dividing register 31.

The microprocessor 10, each function module 20i, clock gear mechanism 30 and thermal monitor 40 are connected with a system bus 50. Moreover, the system clock signal SCK generated by the clock gear mechanism 30 is given to the microprocessor 10, function module 20i and thermal monitor 40.

The thermal monitor 40 will be described referring to FIG. 3(a), (b). FIG. 3(a) shows the configuration and FIG. 3(b) shows the thermal characteristic.

This thermal monitor 40 is provided to detect the temperature of the substrate of the semiconductor integrated circuit or the temperature of a prescribed portion of the substrate. It utilizes the thermal characteristic of the frequency emitted by a ring oscillator 41. As shown in FIG. 3(a), the thermal monitor 40 comprises a ring oscillator 41, a counter 42 which counts oscillation signals of the ring oscillator 41, a data latch 43 which holds count value of the counter 42, and a data latch 44 which holds the count value held by the data latch 43. To each clock terminal data latch 43, 44 given is a same system clock signal SCK in common.

Each output of data latch 43, 44 is connected to a subtracter 45. And, the difference Stj between the value held in data latch 43 and the value held in data latch 44 is calculated by the subtracter 45. The output of subtracter 45 is connected to one of the input of a comparator (CMP) 46. And, to the other of input of the comparator 46 given is a reference value Sref. The comparator 46 puts out of L level signal as of difference Stj>reference value Stref, and puts out H level signal as of difference Stj≦reference Sref. The output of comparator 46 is connected to the data terminal of an interrupt request register 47.

To the clock terminal of the interrupt request register 47 given is the system clock signal SCK. And, the data held in the interrupt request register 47 is put out to the microprocessor 10 as an interrupt signal EMG.

The ring oscillator 41 is what comprises odd numbers of reverse amplifying circuit chained in the shape of a ring. The oscillation frequency of it is determined by the operation velocity of the transistor comprised in each reverse amplifying circuit. The operation velocity of transistors is faster as temperature Tj of the junction boundary in usual operation temperature range is lower. That is, it is slower as the temperature Tj is higher. Therefore, the oscillation frequency of ring oscillator 41 that is the difference put out of subtracter 45, as shown in FIG. 3(b), has a characteristic that it decreases in accordance with increase of temperature Tj. Thus, by setting the frequency (difference Stj) corresponding to the reference temperature Tjref lower than the maximum permissible temperature Tjmax of transistors, as a reference value Sref; when the temperature Tj of transistors becomes higher than the reference temperature Tjref, the interrupt signal EMG is put in the microprocessor 10.

Figure 4:
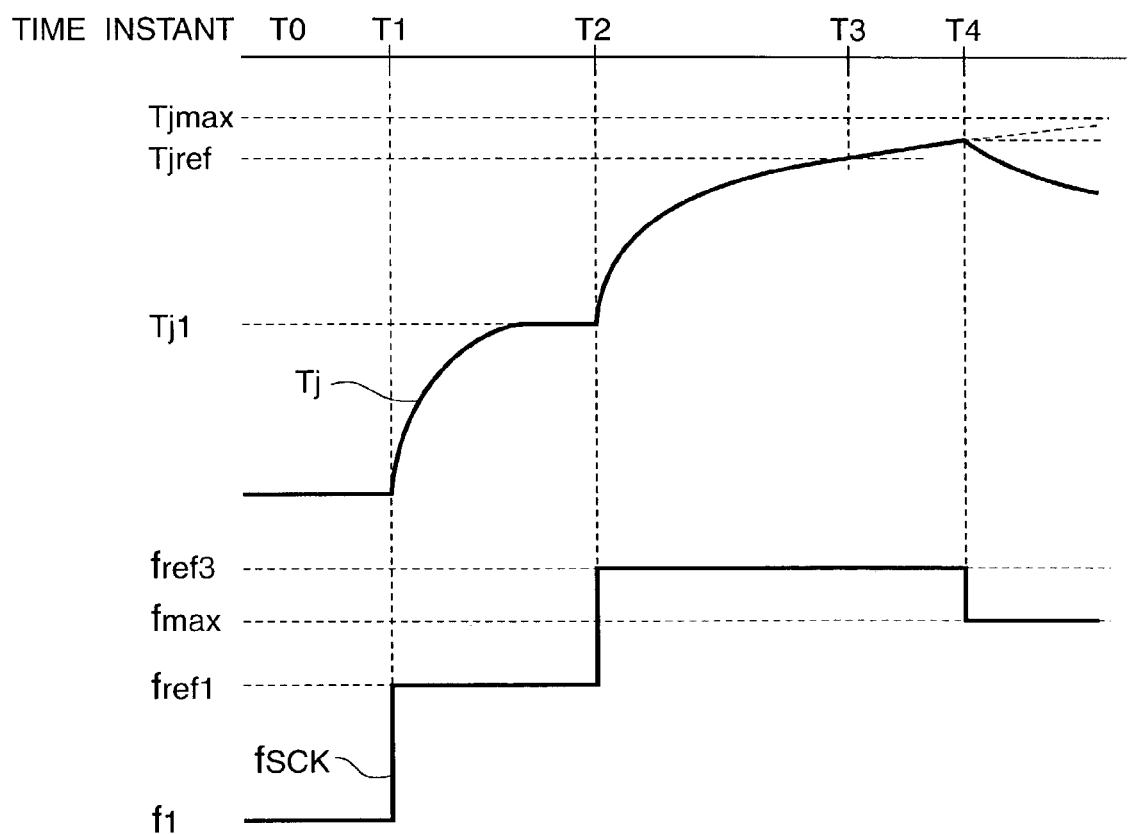
FIG. 4 shows the operation in FIG. 1.

Hereinafter, the operation of the circuit in FIG. 1 will be described referring to FIG. 4 which shows the operation characteristic of FIG. 1.

At the operation start of time instant T0, the frequency fsck of system clock signal SCK is set to a low frequency f1, and performed is a system initializing process etc.

At time instant T1, for example, a communication task starts processing via LAN etc. This kind of task does not need comparatively high process ability because it is processed according to the operator's command and often waits for the operator to input a command. So, at this time instant T1, a prescribed value corresponding to this kind of task is written in frequency division value register 31 from microprocessor 10. Thus, the system goes into the slow operation mode, by setting the frequency fsck of clock signal SCK to fref1. And, by setting fsck from f1 to fref1 (c.f. FIG. 4, T1), the semiconductor integrated circuit starts to consume electricity more than ever, and the package temperature Tj gradually increases to the temperature calculated according to the next formula.

$$Tj1=Rj\cdot\alpha\cdot T\cdot fref1 \text{ (provided T=1)}.$$

At time instant T2, started a task, for example, decoding of moving picture which needs high processing rate; the value of the frequency division value register 31 is rewritten; frequency fsck of system clock signal SCK is set from fref1 further to fref3. By this setting, processing rate increases, toggle rate goes up, and package temperature Tj increases up near to the temperature Tjmax calculated according the next formula.

$$Tjmax<Tj=Rj\cdot\alpha\cdot T\cdot fref3 \text{ (provided T is approximately 1)}$$

At time instant T3, reached package temperature Tj to reference temp. Tjref, interrupt signal EMG is put out from thermal monitor 40 to microprocessor 10.

At time instant T4, microprocessor 10 rewrites the value of freq. div.val.register 31. Thus, the frequency fsck of system clock signal SCK is set from fref3 to fmax (provided fmax<fref3), the electricity consumption is restrained to a prescribed value.

As described above, the semiconductor integrated circuit of Embodiment 1 comprises thermal monitor 40, which actually watches package temp. Tj and puts out interrupt signal EMG when temp. Tj reached to ref.temp.Tjref. Thus, microprocessor 10 can control frequency fsck of system clock signal SCK to a prescribed value with clock gear mec. 30. Consequently, obtained is a merit that the system is able to process operation at the maximum rate not causing abnormal operation by over heating.

<Embodiment 2>

Figure 5:
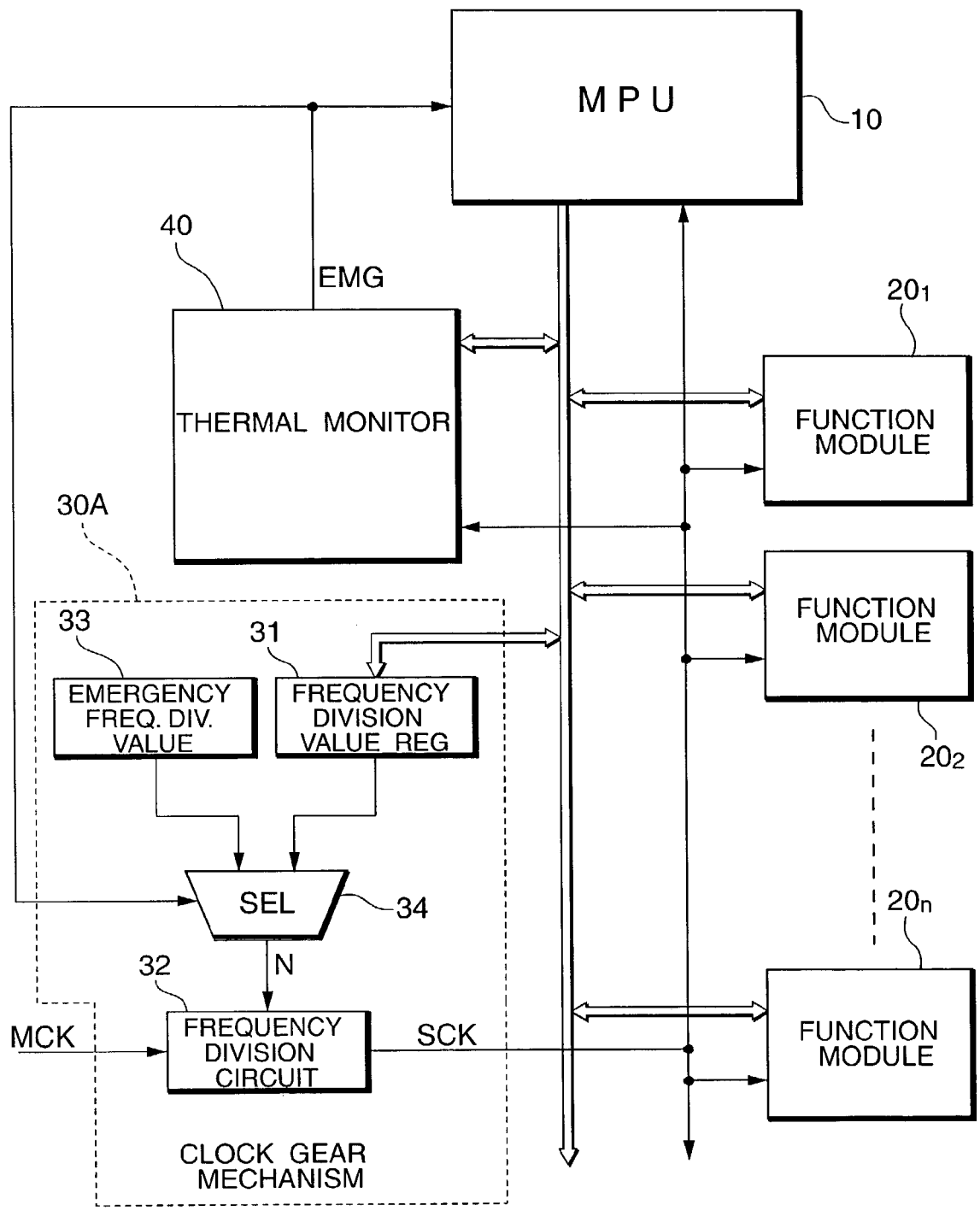
FIG. 5 is a block diagram showing the circuit of Embodiment 2.

The semiconductor integrated circuit of Embodiment 2 of present invention will be described referring to FIG. 5 where the same parts as in FIG. 1 is designated with the same symbol as in FIG. 1.

This circuit comprises clock gear mechanism 30A which configuration is different from clock gear mec. 30 of the circuit in FIG. 1 instead of this.

The clock gear mechanism 30A comprises a freq.div.val-.register 31 and a freq.div.circuit 32 as in FIG. 1, and further comprises an emergency freq.div.val.register 33 and a selector (SEL) 34. The emergency freq.div.val.register 33 holds a fixed freq.div.value for setting a low frequency fsck of system clock signal SCK, so as to get quickly down from a high temperature state when the package temp. Tj became too high.

The selector 34 selects either of the freq.div.value of freq.div.val.register 31 or emergency freq.div.val.register 33. The former is selected when thermal monitor 40 puts out the L level of interrupt signal EMG. The latter is selected when it puts out the H level. And, the selected value is put out to freq.div.circuit 30. The configuration is otherwise the same as FIG. 1.

Next, the operation will be described.

When package temp. Tj does not reach to ref.temp.Tjref, the interrupt signal EMG put out from thermal monitor 40 is L level, and the freq.dig.val.register 31 is selected by selector 34 in clock gear mec. 30A. Thus, the operation becomes same as that of Embodiment 1.

When the package temp. Tj reaches ref.temp.Tjref, the interrupt signal EMG put out from thermal monitor 40 becomes H level, and the emergency freq.div.val.register 33 is selected by selector 34 in clock gear mec. 30A. Thus, the frequency division value of freq.div.circuit 32 is not controlled by microprocessor 10 but instead is controlled directly by a fixed freq.div.value. And, the frequency fsck of the system clock signal SCK is changed to a low frequency which is able to let the device cool quickly.

As mentioned above, the semiconductor integrated circuit of Embodiment 2 comprises a clock gear mec. 30A which can change the frequency fsck of system clock signal SCK to a prescribed fixed low frequency by the interrupt signal EMG which is put out when pac.temp.Tj reached ref.temp.Tjref. Thus, even if the microprocessor 10 became unable to process any control owing to an overheat, the frequency fsck of system clock SCK can be decreased. Therefore, in addition to the merit of Embodiment 1, there is another merit that the security of system can be made certain.

<Embodiment 3>

The semiconductor integrated circuit of Embodiment 3 of present invention will be described referring to FIG. 6 where the same parts as those in FIG. 1 are designated with the same symbols as those in FIG. 1.

Figure 6:
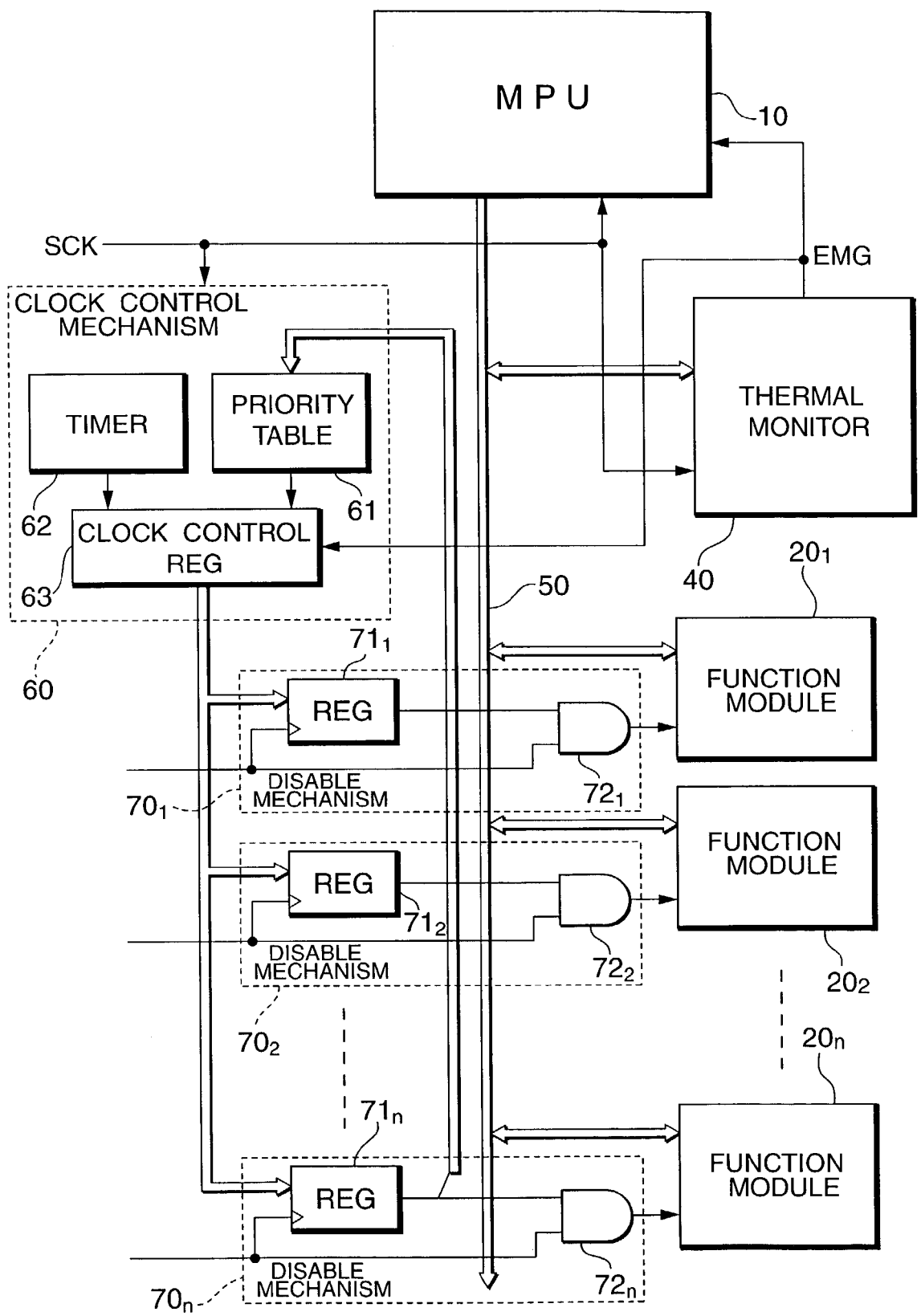
FIG. 6 is a block diagram showing the circuit of Embodiment 3.

The circuit in FIG. 6 comprises a microprocessor 10, single or plural function modules 20i, a thermal monitor 40 and a system bus 50 as well as those in FIG. 1, further comprises a clock control mechanism (as an example of an operation controlling means) 60 and disable mechanisms (as example of clock controlling means) 70i.

The clock control mechanism 60 is what puts out a signal for controlling each function module 20i, according to each priority of each module. It comprises a priority table 61 which is set each priority of each function module 20i in system in advance, a timer 62 which counts a certain time interval, and a clock control register 63.

The priority table 61 is memorized each priority of each function module 20i. And it is inputted each clock enable state signal of each function module 20i. Thus, it decodes the state signal to detect present operating modules. And, it selects a module which priority is the lowest among present operating modules.

The clock control register 63 is what puts out a signal for stopping a clock signal of function module which priority is the lowest at the time when the interrupt signal EMG put out from thermal monitor 40. After this operation, it starts operating at each time instant indicated by timer 62, which counts a fixed time interval between each time instant. And, it puts out a signal for stopping a clock signal of function module which priority is the lowest at the time when it started. On the other hand, it puts out a signal for keeping present state when the interrupt signal EMG is L level.

The disable mechanism 70i controls providing of clock signal according to the operation control signal for each function module given from clock control mechanism 60. Each disable mechanism 70i comprises a register 71i and an AND gate 72i respectively. Each register 71i holds the signal from clock cont.register 63 according to the timing of the clock signal CKi respectively. And they put out signals corresponding to data held in them respectively. Moreover, each AND gate 72i takes a logical AND of clock signal CKi and signal from register 71i, so as to give it to the clock terminal of corresponding function module 20i.

Figures 7A, 7B:
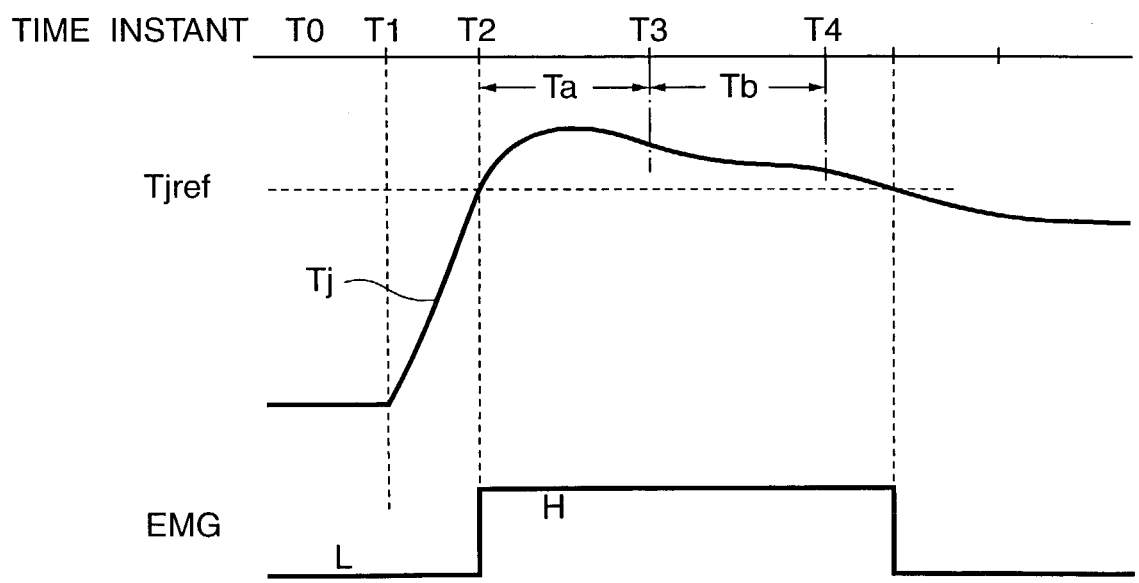
FIG. 7 shows the operation in FIG. 6.

Next, the operation of the circuit in FIG. 6 is described referring to FIG. 7(a),(b). FIG. 7(a) shows an example of priority table. And, FIG. 7(b) shows an example of signal wave figure in system operation.

At the operation start time of time instant T0, each function module is halted, and pac.temp.Tj settles down at temp. lower than ref.temp.Tjref.

At time instant T1, the system proceeds an operation mode by microprocessor 10, and put out are some of clock enable signals for function module 20i. By these signals, some of function modules start operating, and pac.temp.Tj increases. On the other hand, in the priority table 61 decoded is the least effective module among operating function module 20i in the system.

The pac.temp.Tj still increases as further more function modules 20i start operating according to each of their processes.

At time interval T2, pac.temp.Tj exceeds ref.temp.Tjref, then the interrupt signal EMG put out from thermal monitor 40 becomes H level. Thus, a signal for making the clock signal CKi of the number i function module 20i is put out from the clock control register 63 of clock cont.mec.60. In this way, the clock signal which has been provided to function module 20i is halted, and by function module 20i halting, the electricity consumption decreases.

At this time, in the priority table 61, the inputted clock enable state signal becomes disabled, and the next-to-lowest priority function module operating is decoded. In the example shown in FIG. 7(a), the next-to-lowest priority N-1 belongs to the function module "m", but this is not operating. Therefore, the operating function module "j" is decoded. Thus, the operation of it is halted.

At time instant T3 when a certain time Ta has passed, the clock control register 63 is started by the timer 62. At this time, if pac.temp.Tj exceeded ref temp.Tjref, the interrupt signal has become H level. Thus, put out is a signal for making disable of the clock signal CKj of the function module 20j which is operating and which priority is next-to-lowest.

This kind of operations are processed each fixed time Ta until the interrupt signal EMG becomes L level. And, the clock signal CKj of function module 20i is made disable in order of lower priority.

On the other hand, in microprocessor 10, when the interrupt signal EMG becomes H level, the interrupting process starts. And, a suitable control of electricity consumption is performed according to the program executed in microprocessor 10.

As mentioned above, this semiconductor integrated circuit of Embodiment 3 comprises a clock control mechanism 60 and disable mechanism 70i which halt clock signal CKi provided to function module 20i in prescribed order at regular intervals Ta according prescribed priority, when the package temperature Tj exceeded the reference temperature Tjref. Thus, without control of microprocessor 10 a suitable control of function module is performed before pac.temp.Tj exceeds the maximum permissible temp.Tjmax. Therefore, there is a merit that increase of temperature Tj is prevented and operation processed at optimum rate is kept.

<Embodiment 4>

The semiconductor integrated circuit of Embodiment 4 of present invention will be described referring to FIG. 8 where same parts as in FIG. 6 are designated with same symbols.

The circuit in FIG. 8 comprises a microprocessor 10, plural function module 20i, a thermal monitor 40, a system bus 50 and disable mechanism 70i as well as in FIG. 6, further comprises a clock control mechanism 60A which configuration is a little different from the clock control mec.60 in FIG. 6.

The clock control mechanism 60A comprises a priority table 64, a timer 65 and a clock control decoder 66. The priority table 64 is what holds priorities used. And, these priority used can be changed by microprocessor 10 according to the application. The timer 65 is what counts off watching time Toff and on watching time Ton. These off watching time Toff and on watching time Ton are set by microprocessor 10. The clock control decoder 66 is what controls providing each function module with clock signal according to the information given from the priority table 64 and the timer 65. The other configuration is same as FIG. 6.

Next, the operation will be described.

At operation starting time, each function module is halted. And, pac.temp.Tj is settled down to the temp. lower than ref.temp.Tjref.

At a certain timing, some of function modules 20i start operating. Then, the electricity consumption increases and pac.temp. rises. When pac.temp.Tj exceeds ref temp.Tjref, the interrupt signal EMG put out from monitor 40 becomes H level.

Thus, in clock control decoder 66 of clock control mec. 60, selected is a function module 20j which priority is the lowest among operating modules according to the information of priority table 64. And, a signal for making disable of system clock signal SCK is put out for this function module 20j. Thus, the function module 20j stops operating.

Further, if the interrupt signal EMG is still H level when the off watching time Toff passed after the interrupt signal EMG became H level, selected is a next-to-lowest priority operating module 20k. And, this module 20k is made disable. These controls performed each off watching time Toff by timer 65 are repeated while the interrupt signal EMG is H level. And, modules are made disable in order of lower priority.

In the reverse operation, if the interrupt signal EMG had become L level after off watching time Toff and still was L level after on watching time Ton had passed, a system clock signal SCK is made enable for the function module 20k which was made disable at last according to the clock control decoder 66. Further, if the interrupt signal EMG was still L level after on watching time Ton had passed, made enable is the function module 20j which had been made disable next-to-last.

In the clock control decoder 66, until an indication is given from microprocessor 10, the control mentioned above is automatically processed.

On the other hand, in microprocessor 10, when the interrupt signal EMG became H level, a suitable electricity consumption control is performed according to the program executed in microprocessor 10.

As mentioned above, the semiconductor integrated circuit of Embodiment 4 comprises a clock control mechanism 60A for halting and providing clock signal CKi for function module 20i in order of the priority according to the interrupt signal EMG put out at regular interval from thermal monitor 40. Thus, the function module 20i once halted can be started again. Therefore, there is another merit than the merit of Embodiment 3 that the recovering of system has become to be completed rapidly.

<Embodiment 5>

The semiconductor integrated circuit of Embodiment 5 of present invention will be described according to FIG. 9.

Figure 9:
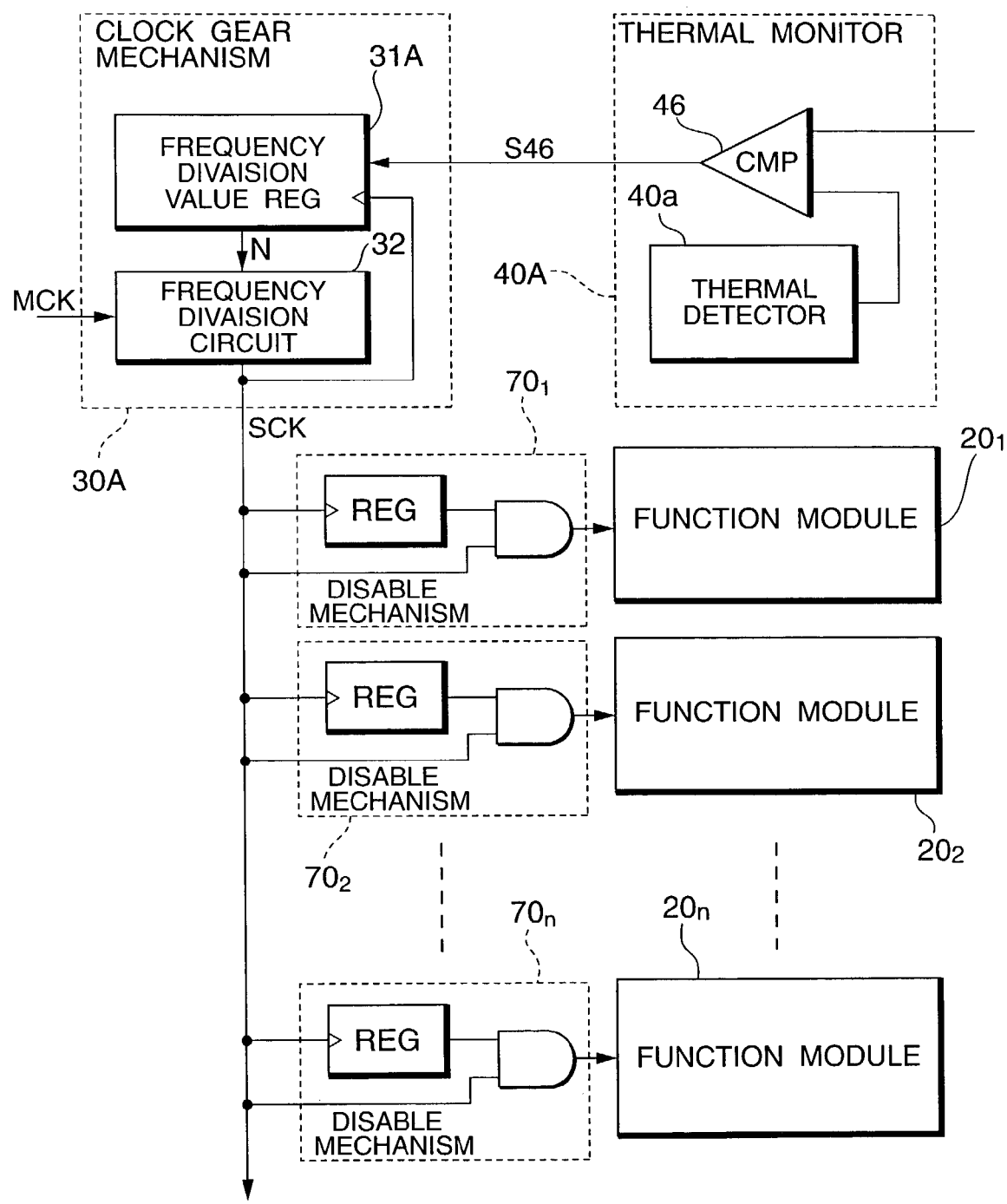
FIG. 9 is a block diagram showing the circuit of Embodiment 5.

The circuit in FIG. 9 comprises a clock gear mechanism 30A and a thermal monitor 40A. And, system clock signal SCK is provided from this clock gear mec.30A to plural function module 20i via disable mechanism 70i.

The clock gear mec.30A comprises a freq.div.val.register 31A which holds frequency division value N for inputted clock signal MCK, and a freq.div.circuit 32 which generates system clock signal SCK by dividing the inputted clock signal MCK in 1/N according to this freq.div.value N. The freq.div.register 31A is made up to count up freq.div.value N by the signal given from thermal monitor 40A. Moreover, freq.div.value N can be set to any value by microprocessor not shown in FIG. 9.

The thermal monitor 40A comprises a thermal detector 40a and a comparator 46 which compares pac.temp.Tj detected by this thermal detector 40a with ref.temp.Tjref. And, the signal put out from comparator 46 is set to become L level as of temp.Tj<ref.temp.Tjref, and become H level as of temp.Tj≦reftemp.Tjref. In addition, reftemp.Tjref is set to the value less that the highest permissible temp.Tjmax given by subtracting a certain margin from it.

Figure 10:
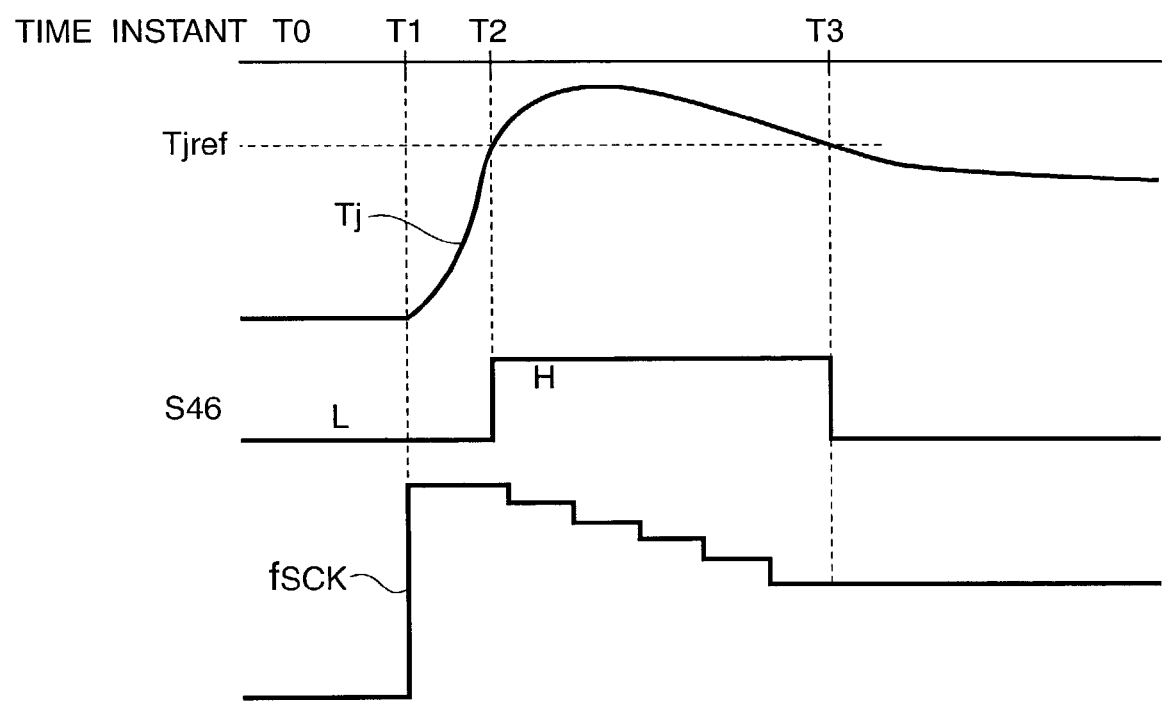
FIG. 10 shows the operation in FIG. 9.

Hereinafter, the operation of FIG. 9 will be described referring to FIG. 10 where the signal wave in operation is shown.

At the operation starting time of time interval T0, sufficiently large value is set in freq.div.val.register 31A as freq.div.value N. So, the frequency fsck of system clock signal SCK generated by freq.div.circuit 32 becomes low. Therefore, each function module 20i operates in slow operating mode. Consequently, electricity consumption is small and pac.temp.Tj is near to that of the environmental air.

At time instant T1, a small freq.div.value N is set to freg.div.val.register 31A, so as to increase frequency fsck of system clock signal SCK and change into high speed operating mode. Then, electricity consumption increases and pac.temp. goes up.

At time instant T2, pac.temp.Tj exceeds ref.temp.Tjref. Then, the signal put out from comparator 46 of thermal monitor 40A becomes L level. Thus, freq.div.value N of freq.div.val.register 31A in clock gear mec. 30A is counted up in order. And, the frequency fsck of system clock signal SCK generated by freq.div.circuit 32 gradually decreases.

At time instant T3, electricity consumption decreases by the decrease of the frequency fsck of system clock signal SCK, and pac.temp.Tj drops from ref.temp.Tjref. Then, the signal from comparator 46 becomes L level. Thus, freq.div.value N of freq.div.val.register 31A is fixed at that value, and the frequency fsck is also fixed.

As mentioned above, the semiconductor integrated circuit of Embodiment 5 comprises a thermal monitor 40A which compares pac.temp.Tj with ref.temp.Tjref, and a clock gear mec. 30A which gradually decreases frequency fsck of system clock signal SCK by counting up freq.div.value N in order, when temp.Tj exceeded ref.temp.Tjref. Thus, the system can be operated at the highest speed that the overheat of the semiconductor integrated circuit does not occur.

<Embodiment 6>

The semiconductor integrated circuit of Embodiment 6 will be described referring to FIG. 11.

Figure 11:
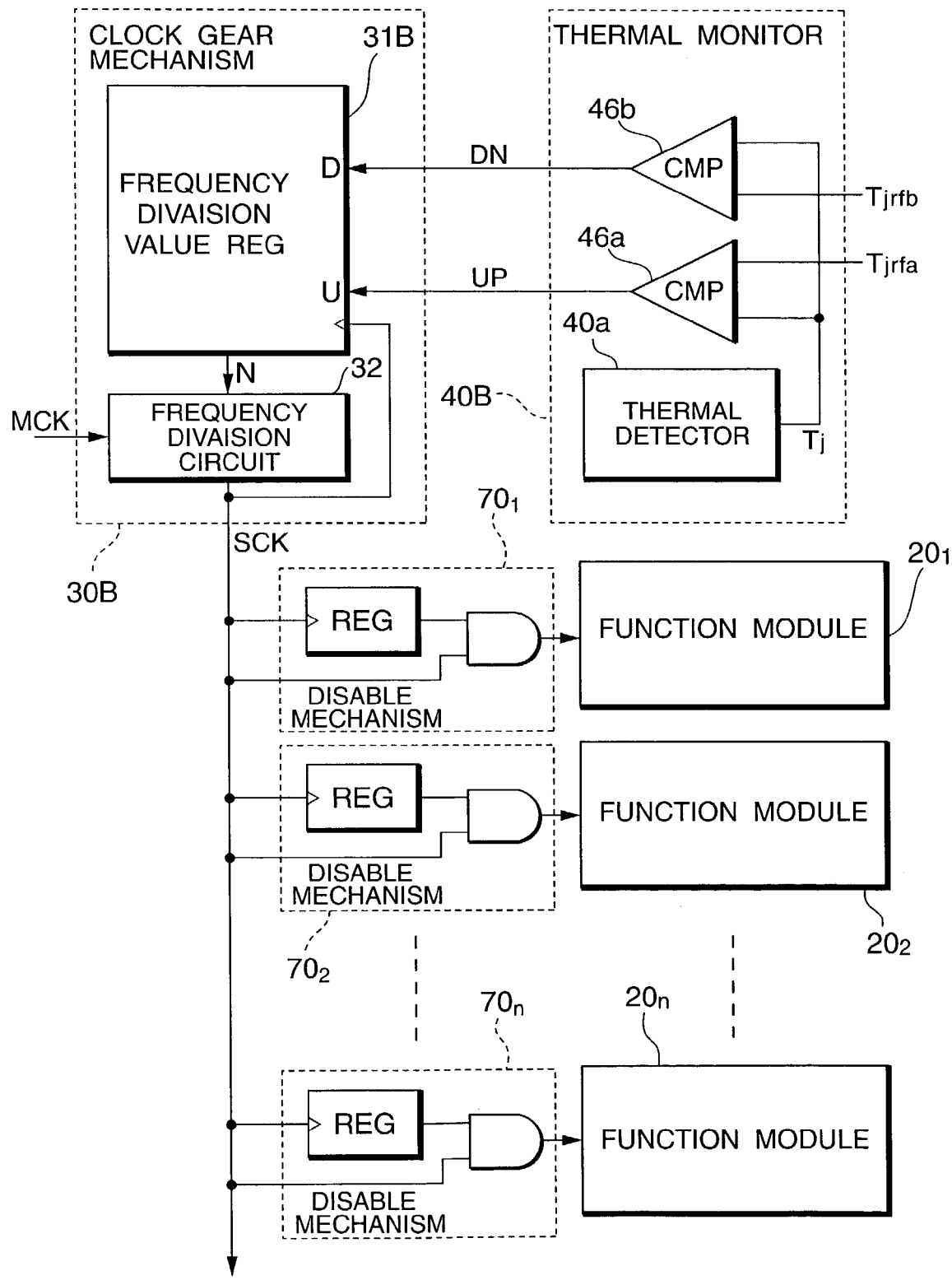
FIG. 11 is a block diagram showing the circuit of Embodiment 6.

The circuit in FIG. 11 comprises a clock gear mechanism 30B and a thermal monitor 40B. And, it is made up to provide plural function modules 20i with system clock signal SCK from the clock gear mechanism 30B via disable mechanism 70i.

The clock gear mechanism 30B comprises a freq.div.val. register 31B which holds freq.div.value N for the inputted clock signal MCK, and a freq.div.circuit 32 which generates system clock signal SCK by dividing the inputted clock signal MCK according to this freq.div.value N. The freq. div.val.register 31B is made up to count up freq.div.value N by a signal UP given by thermal monitor 40B and count down it by a signal DN. Moreover, freq.div.value N of freq.div. val.register 31B is set to any value by microprocessor not shown in FIG. 11.

The thermal monitor 40B comprises a thermal detector 40a, a comparator 46a which compares pac.temp.Tj detected by this thermal detector 40a with ref.temp.Tjrfa, and a comparator 46b which compares temp.Tj with ref.temp.Tjrfb.

And, the signal UP put out from comparator 46a is set to become L level as of temp.Tj<ref.temp.Tjrfa, and become H level as of temp.Tj≧ref.temp.Tjrfa. On the other hand, the signal DN put out from comparator 46b is set to become L level as of temp.Tj>ref.temp.Tj, and become H level as of temp.Tj≦ref.temp.Tjrfa. In addition, ref.temp.Tjrfa,Tjrfb and maximum permissible temp.Tjmax are set to have relations represented by next formula.

$$Tjrfb < Tjrfa < Tjmax$$

Figure 12:
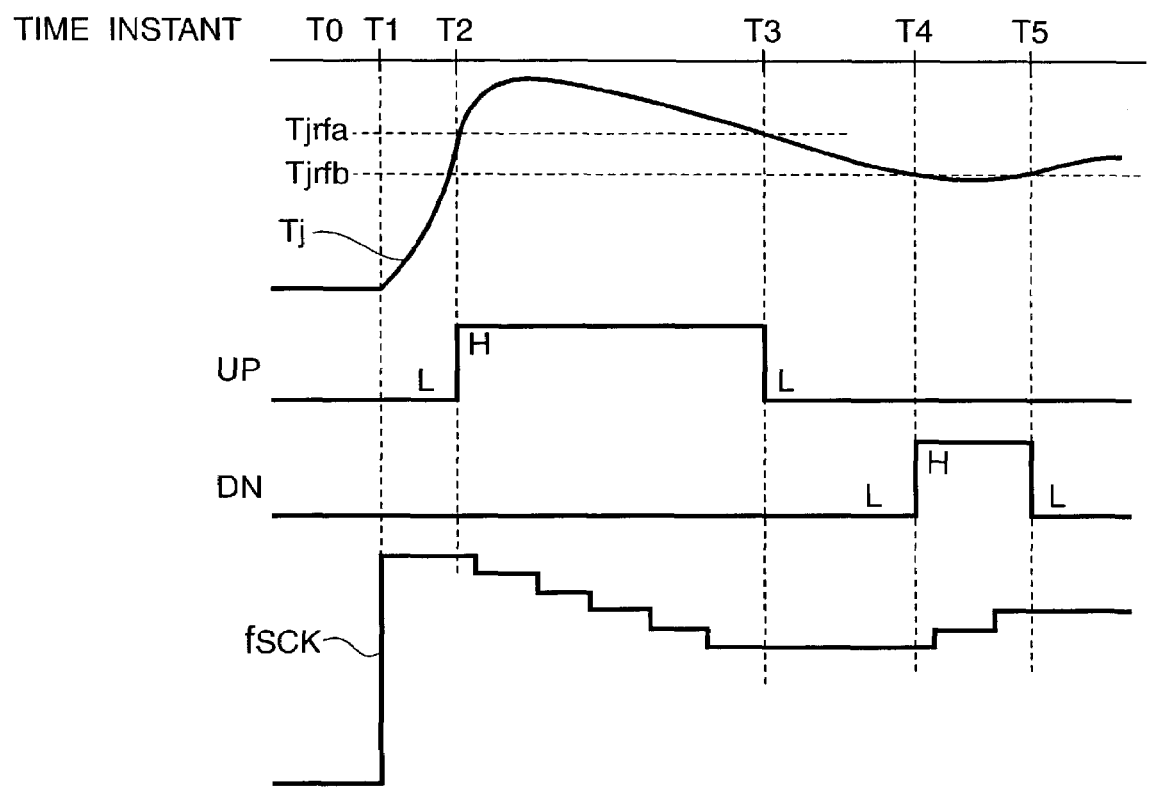
FIG. 12 shows the operation in FIG. 11.

Hereinafter, the operation of FIG. 11 will be described referring to FIG. 12 where signal waves in FIG. 11 are shown.

At the operation starting time of time instant T0, a sufficiently large value is set in freq.div.val.register 31B as freq.div.value N. So, frequency fsck of system clock signal SCK generated by freq.div.circuit 32 has become low. Therefore, each function module 20i is operating at slow operating mode. Consequently, electricity consumption is small, and pac.temp.Tj has become near to environmental temp.

At time instant T1, a small value is set in freq.div.val. register 31B as freq.div.value N. Thus, frequency fsck of system clock signal SCK is increased and the system is changed into high speed operating mode. Then, electricity consumption increases and pac.temp.Tj goes up.

At time instant T2, pac.temp.Tj exceeds ref.temp.Tjrfa. Then, the signal UP put out from the comparator 46a of thermal monitor 40B. Thus, the freq.div.value N of freq. div.val.register 31B in clock gear mec.30B is counted up in order. And, the frequency fsck of system clock signal SCK generated by freq.div. circuit 32 gradually decreases.

At time instant T3, electricity consumption decreases with the decrease of frequency fsck of system clock signal SCK. And, pac.temp.Tj come down below ref.temp.Tjrfa. Then, the signal UP put out from comparator 46a becomes L level. Thus, freq.div.value N of freq.div.val.register 31B is fixed at that value, and frequency fsck is also fixed.

At time instant T4, pac.temp.Tj still come down below ref temp.Tjrfb. Then, the signal DN put out from comparator 46b becomes H level. Thus, freq.div.value N of freq.div. val.register 31B is counted down in order. And, frequency fsck of system clock signal SCK generated by freq.div.circuit 32 gradually increases.

And, at time instant T5, electricity consumption increases by the increase of frequency fsck of system clock signal SCK. Thus, pac.temp.Tj goes up beyond ref.temp.Tjrfb. Then, the signal DN put out from comparator 46b becomes L level. Thus, the freq.div.value N of freq.div.val.register 31B is fixed at that value, and the frequency fsck is also fixed.

With these repeated processes mentioned above, pac. temp.Tj is controlled to be an intermediate value between ref.temp.Tjrfb and ref temp.Tjrfa.

As mentioned above, the semiconductor integrated circuit of Embodiment 6 comprises a thermal monitor 40B which compares pac.temp.Tj with ref temp.Tjrfa,Tjrfb, and a clock gear mec. 30B which controls frequency fsck of system clock signal SCK to get temp.Tj come into the range of ref.temp.Tjrfa to Tjrfb by counting up or down freq.div. value N when the temp Tj goes out of the range of ref.temp.Tjrfa to Tjrfb. Thus, the frequency fsck of system clock signal SCK which once decreased by temp. rise can be increased when temp. dropped. Therefore, there is another merit that the recovery of system is rapid as well as the merit of Embodiment 5.

In addition, the present invention is not limited to embodiments mentioned above. And, it can be embodied in various forms. There are some examples of modified embodiments hereinafter described.

(a) As for configuration of thermal monitor 40 etc. it is not limited to what is shown in FIG. 3(*a*). Whichever form can be adopted as well, as far as it can detect temp. of package or substrate higher or lower than ref.temp.

(b) As for priority table 61 of clock control mec.60 in FIG. 6 and priority table 64 of clock control mec.60A in FIG. 8, priority about function of each module 20i is set in these tables. However, the priority may be set in order of large electricity consumption of function module 20i to halt. Thus, function module 20i stop operating in order of large electricity consumption. Therefore, the time for coming down to safe temp. can be shortened.

(c) As for the semiconductor integrated circuit in FIG. 6 and FIG. 8, it does not comprise any clock gear mec. However, it may comprise a clock gear mec. for controlling frequency of system clock signal SCK according to the interrupt signal EMG from thermal monitor 40. Thus, according to the operation state of system, further suitable frequency of system clock signal SCK can be set. And, the operating speed can be still higher within the range of not causing overheat.

What is claimed is:

1. A semiconductor integrated circuit comprising:
a substrate,
a plurality of function modules on the substrate and performing different processes,
a thermal detecting means to put out an interrupt signal when the temperature of the substrate exceeds a reference temperature, the thermal detecting means comprising a thermal detector that includes a ring oscillator on the substrate,
a clock providing means, including a frequency division value register and an emergency frequency division value register, for providing each function module with an inputted clock signal divided by a frequency division value set in the frequency division value register, when the interrupt signal is not put out and divided by an emergency frequency division value set in the emergency frequency division value register when the interrupt signal is put out, and
a microprocessor to control the system including the function modules as well as to provide the frequency division value according to the interrupt signal of the thermal interrupt means,
wherein the thermal detector produces an output signal having a magnitude corresponding to the frequency of the ring oscillator,
wherein the thermal detecting means further comprises a comparator to compare the output signal of the thermal detector to a reference signal, and an interrupt request register that receives an output signal from the comparator and outputs the interrupt signal to the microprocessor, and
wherein the thermal detector additionally includes a counter that counts oscillations of the ring oscillator, a first data latch that holds a count value of the counter, a second data latch that holds the count value held by the first data latch, and a subtracter that subtracts the value held by the second data latch from the value held by the first data latch to generate the output signal of the thermal detector.

2. A semiconductor integrated circuit comprising:
a substrate,
a plurality of function modules on the substrate and performing different processes,
a thermal detecting means to put out an interrupt signal when the substrate temperature exceeds a reference temperature, the thermal detecting means comprising a thermal detector that includes a ring oscillator on the substrate,
an operation controlling means to provide the modules with operation controlling signals at regular intervals according to a table which designates an order in which the function modules are to be stopped when the interrupt signal is put out, and
a clock controlling means to control output of a clock signal to the function modules according to the operation controlling signals,
wherein the thermal detector produces an output signal having a magnitude corresponding to the frequency of the ring oscillator,
wherein the thermal detecting means further comprises a comparator to compare the output signal of the thermal detector to a reference signal, and
wherein the thermal detector additionally includes a counter that counts oscillations of the ring oscillator, a first data latch that holds a count value of the counter, a second data latch that holds the count value held by the first data latch, and a subtracter that subtracts the value held by the second data latch from the value held by the first data latch to generate the output signal of the thermal detector.

3. A semiconductor integrated circuit according to claim 2 wherein the table is compiled according to processes performed by the function modules.

4. A semiconductor integrated circuit according to claim 2 wherein the table is compiled according to electricity consumption of the function modules.

5. A semiconductor integrated circuit comprising:
a substrate,
a plurality of function modules on the substrate and performing different processes,
a thermal detecting means for generating an interrupt signal when the substrate temperature exceeds a reference temperature, the thermal detecting means comprising a thermal detector that includes a ring oscillator on the substrate, and
clock controlling means to put out an operation controlling signal for stopping function modules in a predetermined order during a first interval according to a table which is compiled from priorities assigned to the function modules when the interrupt signal is put out, and to put out another operation controlling signal for starting function modules in order during a second interval according to the table, output of a clock signal for the function modules being controlled according to the operation control signals,
wherein the thermal detector produces an output signal having a magnitude corresponding to the frequency of the ring oscillator,
wherein the thermal detecting means further comprises a comparator to compare the output signal of the thermal detector to a reference signal, and an interrupt request register that receives an output signal from the comparator and outputs the interrupt signal, and wherein the thermal detector additionally includes a counter that counts oscillations of the ring oscillator, a first data latch that holds a count value of the counter, a second data latch that holds the count value held by the first data latch, and a subtracter that subtracts the value held by the second data latch from the value held by the first data latch to generate the output signal of the thermal detector.

* * * * *